United States Patent
Bowen

(10) Patent No.: US 6,499,370 B2
(45) Date of Patent: Dec. 31, 2002

(54) TWIN CLUTCH AUTOMATED TRANSAXLE WITH MOTOR/GENERATOR SYNCHRONIZATION

(75) Inventor: Thomas C. Bowen, Rochester Hills, MI (US)

(73) Assignee: New Venture Gear, Inc., Troy, MI (US)

(*) Notice: Subject to any disclaimer, the term of this patent is extended or adjusted under 35 U.S.C. 154(b) by 13 days.

(21) Appl. No.: 09/757,820

(22) Filed: Jan. 10, 2001

(65) Prior Publication Data

US 2002/0088290 A1 Jul. 11, 2002

(51) Int. Cl.[7] .................................. F16H 3/12
(52) U.S. Cl. ............................ 74/330; 74/339
(58) Field of Search ................... 74/339, 330, 359, 74/360; 180/65.2; 477/3, 5

(56) References Cited

U.S. PATENT DOCUMENTS

| | | | |
|---|---|---|---|
| 5,337,848 A | * 8/1994 | Bader | 180/65.2 |
| 5,471,892 A | * 12/1995 | Sherman | 475/207 |
| 5,603,242 A | * 2/1997 | Krieger | 74/335 |
| 5,890,392 A | 4/1999 | Ludanek et al. | |
| 5,943,911 A | 8/1999 | Beckerman | |
| 5,966,989 A | 10/1999 | Reed, Jr. et al. | |
| 6,095,001 A | * 8/2000 | Ruehle et al. | 74/331 |
| 6,209,406 B1 | 4/2001 | Sperber et al. | |
| 6,209,407 B1 | 4/2001 | Sperber et al. | |
| 6,397,692 B1 | * 6/2002 | Carriere | 74/331 |

* cited by examiner

Primary Examiner—Ankur Parekh
(74) Attorney, Agent, or Firm—Harness, Dickey & Pierce P.L.C.

(57) ABSTRACT

An automated twin-clutch multi-speed transmission is disclosed which functions to transfer power from the engine to one or more drivelines of a motor vehicle. The transmission includes a first engine clutch operable to establish a releasable drive connection between the engine and a first input shaft, a first motor/generator connected to the first input shaft, a second engine clutch operable to establish a releasable drive connection between the engine and a second input shaft, a second motor/generator connected to the second input shaft, an output shaft adapted to transfer power to the driveline, and a geartrain for selectively establishing a plurality of forward and reverse speed ratio drive connections between the input shafts and the output shaft. The transmission further includes power-operated dog clutches for selectively engaging constant-mesh gearsets associated with the geartrain, and a transmission controller for controlling coordinated actuation of the first and second engine clutches, the first and second motor/generators, and the power-operated dog clutches to permit non-power interrupted ("powershift") sequential gear changes automatically without input from the vehicle operator.

20 Claims, 3 Drawing Sheets

TWIN CLUTCH AUTOMATED TRANSAXLE WITH MOTOR/GENERATOR SYNCHRONIZATION

FIELD OF THE INVENTION

The present invention relates generally to transmissions for use in motor vehicles and, more particularly, to a twin-clutch automated transmission applicable for use in front-wheel drive and rear-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

Automobile manufacturers are also actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles are equipped with an internal combustion engine and an electric motor that can be operated independently or in combination to drive the vehicle.

There are two types of hybrid vehicles, namely series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

SUMMARY OF THE INVENTION

Accordingly, it is an object of the present invention to provide a twin-clutch transmission and a control system for permitting automatic shifting of the twin-clutch transmission.

As a related object, the twin-clutch automated transmission of the present invention has a compact geartrain applicable for use as a transaxle in front-wheel drive vehicles.

As a further object, the twin-clutch automated transmission of the present invention is also applicable for use in rear-wheel drive vehicles.

According to another object, the twin-clutch automated transmission of the present invention can be used as a hybrid drive system in conjunction with the internal combustion engine.

These and other objects of the present invention are met by providing an automated twin-clutch multi-speed transmission adapted to transfer power from the engine to one or more drivelines of a motor vehicle. The transmission includes a first engine clutch operable to establish a releasable drive connection between the engine and a first input shaft, a first motor/generator connected to the first input shaft, a second engine clutch operable to establish a releasable drive connection between the engine and a second input shaft, a second motor/generator connected to the second input shaft, an output shaft adapted to transfer power to the driveline, and a geartrain for selectively establishing a plurality of forward and reverse speed ratio drive connections between the input shafts and the output shaft. The transmission further includes power-operated dog clutches for selectively engaging constant-mesh gearsets associated with the geartrain, and a transmission controller for controlling coordinated actuation of the first and second engine clutches, the first and second motor/generators, and the power-operated dog clutches to permit non-power interrupted ("powershift") sequential gear changes automatically without input from the vehicle operator. When shifting under power between gear ratios, one engine clutch is released and the corresponding motor/generator is actuated to accelerate/decelerate the released input shaft into speed synchronization with the output shaft. Following completion of speed synchronization, the dog clutch for the selected gearset on the released input shaft is actuated and thereafter the released engine clutch is re-engaged.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

Figure 1:
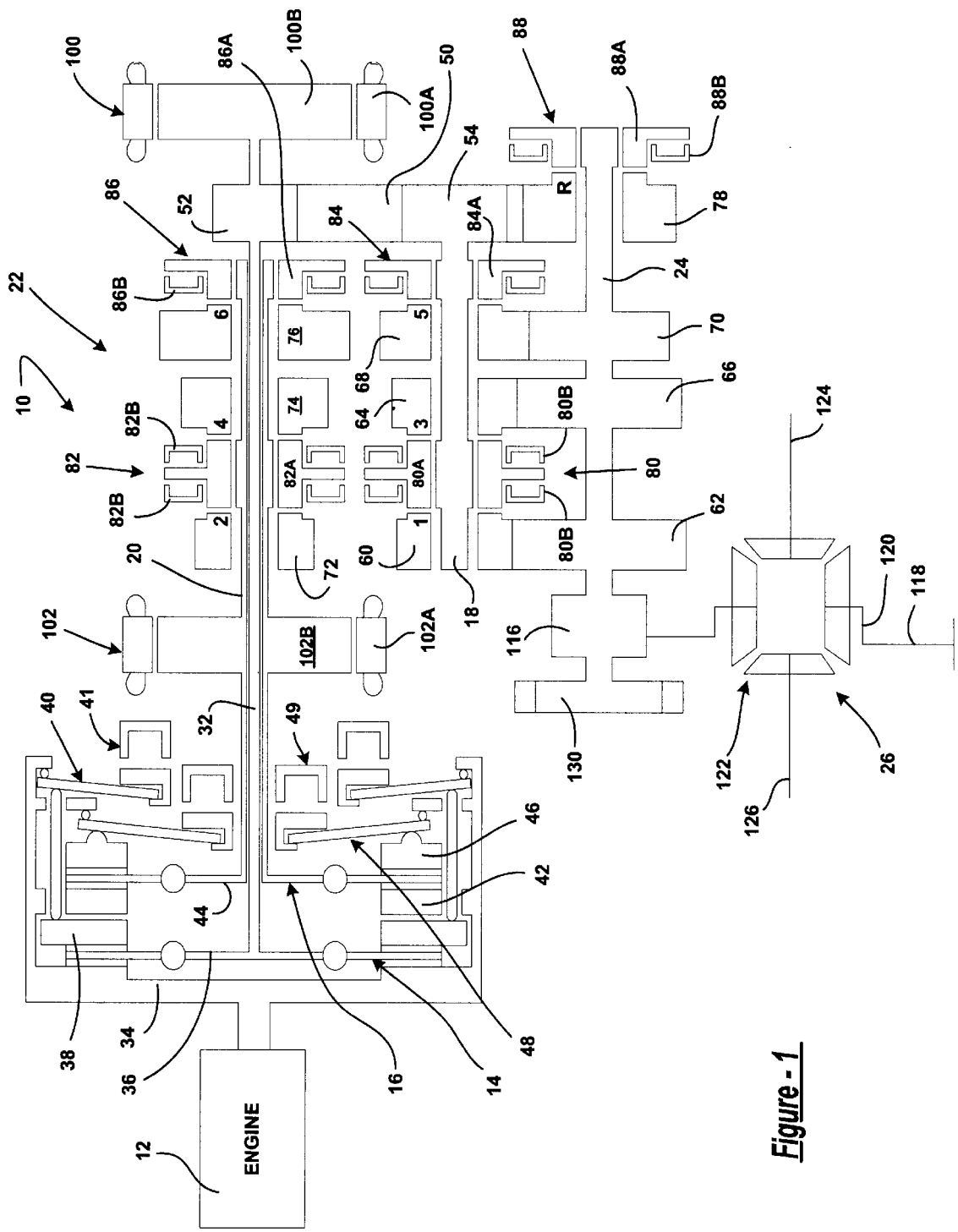
FIG. 1 is a schematic view of a twin-clutch automated transmission according to the principles of the present invention.
Figure 2:
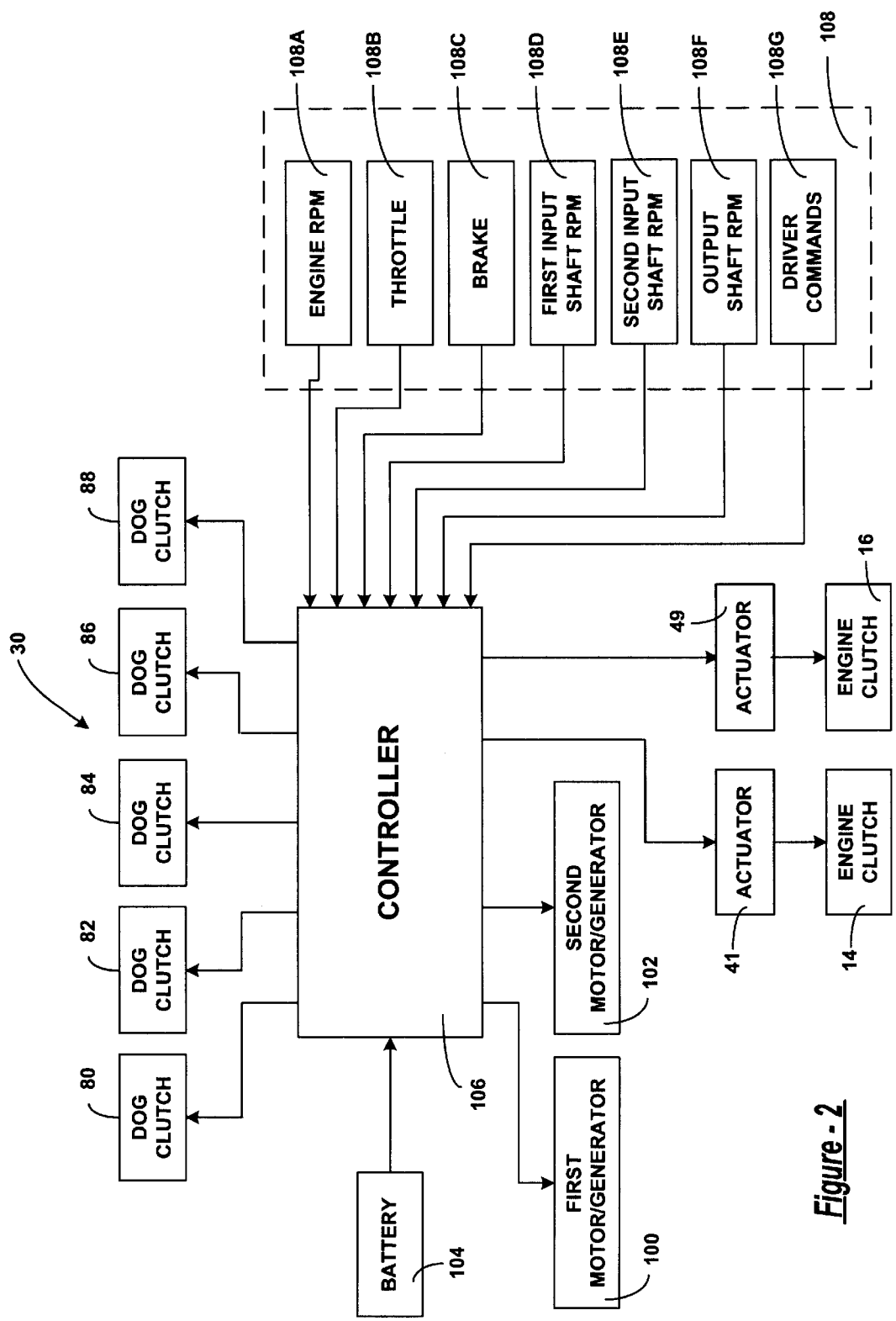
FIG. 2 is a diagrammatically illustration of the transmission control system adapted for use with the twin-clutch automated transmission shown in FIG. 1.

With reference to FIGS. 1 and 2 of the accompanying drawings, a twin-clutch automated transmission, hereinafter referred to as transaxle 10, will now be described. Transaxle 10 is driven by the output of an engine 12 and generally includes a first engine clutch 14, a second engine clutch 16, a first input shaft 18, a second input shaft 20, a geartrain 22, an output shaft 24, a final drive unit 26, and a shift control system 30.

First engine clutch 14 is an electrically-actuated spring-apply plate-type clutch which is normally operable in its engaged state to establish a drive connection between the output of engine 12 and a transfer shaft 32. Likewise, second engine clutch 16 is an electrically-actuated spring-apply plate-type clutch normally operable in its engaged state to establish a drive connection between the output of engine 12 and second input shaft 20. First engine clutch 14 includes a drive plate 34 fixed to the output of engine 12, a friction clutch plate 36 fixed to transfer shaft 32, an apply plate 38, and a spring-biased release mechanism 40 acting on apply plate 38. Release mechanism 40 is moveable to engage and release the drive connection between drive plate 34 and friction clutch plate 36. An actuator 41 is provided to control movement of release mechanism 40. Preferably, actuator 41 is an electrically-actuated device, such as an electromagnectic solenoid, that controls the position of release mechanism 40, and thus the magnitude of engagement of first engine clutch 14, in response to electric power being provided thereto.

Second engine clutch 16 includes a drive plate 42 fixed to drive plate 34, a friction clutch plate 44 fixed to second input shaft 20, an apply plate 46, and a spring-biased release mechanism 48 acting on apply plate 46. Release mechanism 48 is moveable to engage and release the drive connection between drive plate 42 and friction clutch plate 44. Similarly, an actuator 49 is provided to control movement of release mechanism 48. Actuator 49 is an electrically-actuated device that controls the position of release mechanism 48, and thus the magnitude of engagement of second engine clutch 16, in response to the electric power provided thereto. As will be detailed, shift control system 30 is operable to control actuators 41 and 49 and, in turn, the engagement and release of engine clutches 14 and 16. Second input shaft 20 is tubular and is concentrically supported on transfer shaft 32. As seen from the unrolled schematic view shown in FIG. 1, first input shaft 18 is offset from transfer shaft 32. However, a chain 50 meshed between a first sprocket 52 fixed to transfer shaft 32 and a second sprocket 54 fixed to first input shaft 18 provides a direct drive connection between transfer shaft 32 and first input shaft 18.

Geartrain 22 includes a first set of speed gears rotatably supported on first input shaft 18 and a second set of speed gears rotatably supported on second input shaft 20, both of which are in constant mesh with a set of output gears fixed to output shaft 24. The first set of speed gears include a first speed gear 60 which is meshed with a first output gear 62, a third speed gear 64 which is meshed with a second output gear 66, and a fifth speed gear 68 which is meshed with a third output gear 70. Similarly, the second set of speed gears includes a second speed gear 72 which is meshed with first output gear 62, a fourth speed gear 74 which is meshed with second output gear 66, and a sixth speed gear 76 which is meshed with third output gear 70. Geartrain 22 also includes a third sprocket 78 rotatably supported on output shaft 24 and which is also driven by chain 50.

Shift control system 30 includes a plurality of power-operated shift clutches which are operable for selectively coupling a selected speed gear to its corresponding input shaft for establishing six forward and one reverse speed ratio drive connections with output shaft 24. Preferably, these shift clutches are electrically-actuated dog clutches. In particular, a first dog clutch 80 is operable for selectively coupling/releasing first speed gear 60 and third speed gear 64 to/from first input shaft 18, a second dog clutch 82 is operable for selectively coupling/releasing second speed gear 72 and fourth speed gear 74 to/from second input shaft 20, and a third dog clutch 84 operable for selectively coupling/releasing fifth speed gear 68 to first input shaft 18. Shift control system 30 also include a fourth dog clutch 86 that is operable for selectively coupling/releasing sixth speed gear 76 to/from second input shaft 20, and a fifth dog clutch 88 operable for selectively coupling/releasing third sprocket 78 to/from output shaft 24. Each dog clutch includes a sliding sleeve (denoted by the suffix "A") which is splined for rotation with and axial movement on a clutch hub which, in turn, is fixed to a corresponding one of input shafts 18 and 20. As is conventional, axial movement of the sliding sleeves from the neutral uncoupled positions shown results in clutched engagement with the adjacent speed gear. Preferably, each dog clutch is of the electromagnetic type having a coil (denoted by suffix "B") adjacent to and facing a radial armature plate segment of each sliding sleeve. Electrical power delivered to the electromagnetic coils causes controlled axial movement of the shift sleeves. Since first clutch 80 and second clutch 82 are of the double-acting variety, a pair of coils are provided therewith. It is to be understood that any other type of power-operated device capable of moving each sliding sleeve between its uncoupled and coupled positions is within the scope of this invention.

Shift control system 30 further includes a first motor/generator 100 operably connected to first input shaft 18, a second motor/generator 102 operably connected to second input shaft 20, a battery 104, a transmission controller 106, and vehicle sensors 108. First motor/generator 100 includes a fixed stator 100A and a rotor 100B that is fixed for rotation with transfer shaft 32. Likewise, second motor/generator 102 includes a fixed stator 102A and a rotor 102B that is fixed for rotation with second input shaft 20. Controller 106 is an electronically-controlled unit capable of receiving data from vehicle sensors 108 and generating electric output signals in response to the sensor signals. Sensors 108 include engine speed 108A, throttle position 108B, brake status 108C, first input shaft speed 108D, second input shaft speed 108E, output shaft speed 108F, and driver commands 108G.

Controller 106 functions to control shifting of motor/generators 100 and 102 between a "drive" mode, a "regeneration" mode, and a "no-load" mode. In the drive mode, the motor/generator functions as an electric motor and is driven by electric power. In the regeneration mode, the motor/generator functions as an electric generator with regenerative braking) brake torque electrically generated by the motor/generator) for storing electrical energy in battery 104. In the no-load mode, the rotor of the motor/generator is permitted to rotate freely. Controller 106 is also operable to coordinate and monitor actuation of all the electrically-controlled devices associated with transaxle 10 to permit powershifted sequential gear changes automatically without any input from the vehicle operator.

Geartrain 22 is shown in FIG. 1 to further include an output pinion 116 fixed to output shaft 24 which is meshed with a ring gear 118 fixed to final drive unit 26. Final drive unit 26 is a differential having a carrier 120 to which ring gear 118 is fixed, and a gearset 122 for transferring drive torque from carrier 120 to a pair of axle half-shaft 124 and 126. Gearset 122 allows speed differentiation between half-shafts 124 and 126 and carrier 120. A parking pawl 130 is also fixed to output shaft 24 and is operable for releasably locking output shaft 24 to a stationary member (i.e. the housing of transaxle 10) to selectively prevent rotation of output shaft 24. Parking pawl 130 is operable to release output shaft 24 when the gearshift lever is moved out of its PARK position and lock output shaft 24 when the gearshift lever is returned to its PARK position.

If desired, a manually-operable mode selector switch 108G can be provided to shift transaxle 10 from its automatic shift mode to a manual shift mode. The mode switch would, when actuated, allow the vehicle operator to shift the gearshift lever manually to effect sequential gear shifts (without use of a clutch pedal). However, controller 106 would only permit the selected gearshift to be completed if the current vehicle characteristics (i.e. engine speed, vehicle speed, etc.) permit completion of the requested shift.

When it is desired to operate the vehicle, engine 12 is started with the gearshift lever in its PARK position and both engine clutches 14 and 16 engaged such that both input shafts 18 and 20 are in drive connection with the output of engine 12. As an alternative to a conventional starter, one of motodgenerators 100 and 102 can be actuated to start engine 12. Upon starting the vehicle, all of the electrically-actuated dog clutches are released with each shift sleeve located in its neutral uncoupled position, whereby no drive torque is delivered through geartrain 22 to output shaft 24. When the vehicle operator moves the gearshift lever from the PARK position to the DRIVE position, parking pawl 130 is released and first engine clutch 14 is also released. In particular, controller 106 actuates first actuator 41 for releasing first engine clutch 14, whereby the drive connection between engine 12 and first input shaft 18 is released. Controller 106 also shifts first motor/generator 100 into its regeneration mode for causing rotor 100B to retard the rotary speed of first input shaft 18 to match the rotary speed of output shaft 24. Upon completion of speed synchronization, first dog clutch 80 is actuated by controller 106 sending an electrical signal to coil 80B for moving sliding sleeve 80A into clutched engagement with first speed gear 60. As such, first speed gear 60 is coupled for rotation with first input shaft 18, whereby the first forward speed ratio drive connection is established between first input shaft 18 and output shaft 24. Controller 106 then functions to turn off first motor/generator 100 and progressively engage first engine clutch 14 for accelerating the vehicle.

Thereafter, when the vehicle operating parameters indicate a need to shift transmission 10 into the second forward gear ratio, controller 106 actuates second actuator 49 for releasing second engine clutch 16, whereby the drive connection between engine 12 and second input shaft 20 is released. Thereafter, controller 106 shifts second motor/generator 102 into its regeneration mode for retarding the rotary speed of second input shaft 20 so as to synchronize its rotary speed to that of second speed gear 72 which is driven by output gear 62 on output shaft 24. When controller 106 determines that speed synchronization is complete, coil 82B of second dog clutch 82 is activated by controller 106 for moving sliding sleeve 82A such that second speed gear 72 is coupled to second input shaft 20. Transmission controller 106 also then turns off second motor/generator 102. Thereafter, controller 106 coordinates the release of first engine clutch 14 and the re-engagement of second engine clutch 16. Once first engine clutch 14 is released completely, controller 106 causes first dog clutch 80 to return sliding sleeve 80A to its neutral position for uncoupling first speed gear 60 from first input shaft 18.

As will be appreciated, this upshift process continues through each of the other forward speed gear ratios and likewise works in reverse for downshifts so as to establish six forward gear ratios. Specifically, the appropriate motor/generator is placed in its regeneration mode during upshifts to retard the input shaft speed and is placed in its drive mode during downshifts to increase the input shaft speed. As is known, battery 104 is charged during regenerative operation. When the gearshift lever is shifted into its REVERSE position, fifth dog clutch 88 is actuated by controller 106 for causing sleeve 88A to move into clutched engagement with third sprocket 78 for driving output shaft 24 in the opposite direction. With this powershift methodology, transaxle 10 shifts between engine clutches in a power-on shift strategy (i.e. no power interruption).

Figure 3:
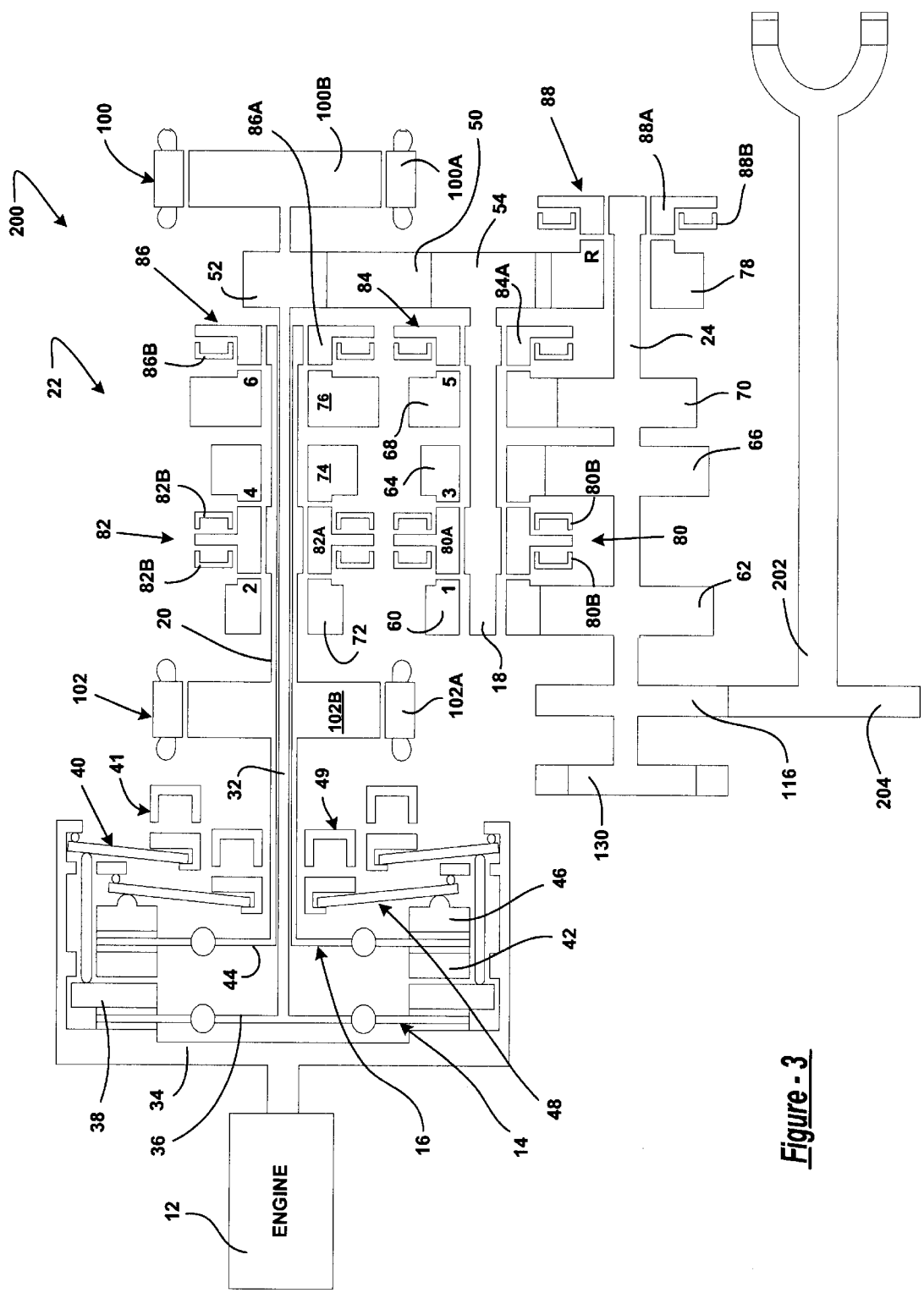
FIG. 3 is a schematic view of a twin-clutch automated transmission according to an alternative embodiment of the present invention.

Referring now to FIG. 3, a rear-wheel drive version of the automated transmission is shown and identified by reference numeral 200. As seen, final drive unit 26 has been eliminated and a drive shaft 202 has been added which is adapted for direct connection to the rear driveline of the motor vehicle. A drive gear 204 fixed to drive shaft 202 is meshed with output pinion 116 for transferring power from output shaft 24 to drive shaft 202. The automatic shifting function of six-speed twin-clutch transmission 200 is identical to six-speed twin clutch transaxle 10.

As a further feature of the present invention, twin-clutch transaxle 10 of FIG. 1 and twin-clutch transmission 200 of FIG. 3 can each be used in a hybrid drive system. In general, the hybrid drive system includes three drive power sources, namely engine 12, first motor/generator 100, and second motor/generator 102. In addition, there are several modes of operation for the motor vehicle, namely: (a) electric; (b) hybrid; (c) engine; and (d) charge. In the electric mode, only motor/generator(s) 100 and 102 provide motive power to output shaft 24. In the hybrid mode, both engine and motor/generators 100 and 102 provide motive power to output shaft 24. In the engine mode, only engine 12 provides motive power to output shaft 24. Finally, in the charge mode, a portion of the engine power is absorbed by one of the motor/generators to charge battery 104.

Thus, the transmissions of the present invention utilize the components typically associated with a manually-shifted synchromesh transmission with power-operated dog clutches in combination with a twin engine clutch arrangement to provide a compact powershifted automated multi-speed transmission. The use of a the compact geartrain allows a desired speed gear to be pre-selected and engaged while disconnected from the engine and thereafter driven by shifting between the engine clutches. Moreover, the use of all electric powered actuators for the engine clutches, dog clutches and motor/generators eliminates the need for a hydraulic system and should promote a highly efficient transmission since electric power is only required for shifting.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A twin-clutch transmission for use in a motor vehicle having an engine and a driveline, comprising:
   an output shaft adapted for connection to the driveline and having an output gear fixed thereto;
   a first input shaft rotatably supporting a first speed gear meshed with said output gear;
   a first engine clutch operable for establishing a releasable drive connection between the engine and said first input shaft via a transfer shaft;
   a first shift clutch operable for releasably coupling said first speed gear to said first input shaft to establish a drive connection between said first input shaft and said output shaft;
   a second substantially tubular input shaft rotatably supporting a second speed gear meshed with said output gear, said second input shaft concentrically encompassing a portion of said transfer shaft;
   a second engine clutch operable for establishing a releasable drive connection between the engine and said second input shaft;
   a second shift clutch operable for releasably coupling said second speed gear to said second input shaft to establish a drive connection between said second input shaft and said output shaft;
   a first motor/generator connected to said first input shaft;
   a second motor/generator connected to said second input shaft; and
   a controller for controlling actuation of said first and second motor/generators.

2. The twin-clutch transmission of claim 1 further comprising:
   a first electric actuator controlling actuation of said first engine clutch; and
   a second electric actuator controlling actuation of said second engine clutch;
   wherein said controller controls actuation of said first and second electric actuators.

3. The twin-clutch transmission of claim 2 wherein said first and second shift clutchs are electrically-actuated dog clutches controlled by said controller.

4. The twin-clutch transmission of claim 1 wherein first motor/generator has a first rotor adapted to drive or be driven by said first input shaft, said second motor/generator has a second rotor adapted to drive or be driven by said second input shaft, whereby when said first input shaft is released from driven connection with the engine and said first shift clutch is disengaged, said first motor/generator is actuated to synchronize the rotary speed of said first input shaft to that of said first speed gear driven by said output gear.

5. The twin-clutch transmission of claim 1 further comprising:
   a second output gear fixed to said output shaft;
   a third speed gear rotatably supported on said first input shaft and meshed with said second output gear; and
   a fourth speed gear rotatably supported on said second input shaft and meshed with said second output gear;
   wherein said first shift clutch is operable for releasably coupling said third speed gear to said first input shaft, and said second shift clutch is operable for releasably coupling said fourth speed gear to said second input shaft.

6. The twin-clutch transmission of claim 1 wherein the driveline is a front driveline and said output shaft drives a final drive unit including a differential and left and right front axleshafts.

7. The twin-clutch transmission of claim 1 wherein said first and second engine clutches and said first and second shift clutches are electrically-actuated devices controlled by said controller for automatically shifting between a first gear ratio established by said first speed gear and a second gear ratio established by said second speed gear.

8. The twin-clutch transmission of claim 7 wherein said first and second shift clutches are electrically-actuated dog clutches.

9. The twin-clutch transmission of claim 1 further comprising a transfer shaft releasably driven by said first engine clutch, and a power transfer assembly coupling said transfer shaft to said first input shaft.

10. The twin-clutch transmission of claim 9 wherein said power transfer assembly includes a first sprocket fixed to said first input shaft, a second sprocket fixed to said transfer shaft, and a chain meshed with said first and second sprockets.

11. A twin-clutch transmission for use in a motor vehicle having an engine and a driveline, comprising:
   an output shaft adapted for connection to the driveline and having an output gear fixed thereto;
   a first input shaft rotatably supporting a first speed gear meshed with said output gear;
   a first engine clutch operable for establishing a releasable drive connection between the engine and said first input shaft;
   a first shift clutch operable for releasably coupling said first speed gear to said first input shaft to establish a drive connection between said first input shaft and said output shaft wherein said first shift clutch includes an electrically energizable coil and an armature plate selectively moveable relative to one another in response to an electrical signal;
   a second input shaft rotatably supporting a second speed gear meshed with said output gear;
   a second engine clutch operable for establishing a releasable drive connection between the engine and said second input shaft;
   a second shift clutch operable for releasably coupling said second speed gear to said second input shaft to establish a drive connection between said second input shaft and said output shaft;
   a first motor/generator connected to said first input shaft;
   a second motor/generator connected to said second input shaft; and
   a controller for controlling actuation of said first and second motor/generators.

12. The twin-clutch transmission of claim 11 further comprising:
   a first electric actuator controlling actuation of said first engine clutch; and
   a second electric actuator controlling actuation of said second engine clutch;
   wherein said controller controls actuation of said first and second electric actuators.

13. The twin-clutch transmission of claim 12 wherein said first and second shift clutches are electrically-actuated dog clutches controller by said controller.

14. The twin-clutch transmission of claim 11 wherein first motor/generator has a first rotor adapted to drive or be driven by said first input shaft, said second motor/generator has a second rotor adapted to drive or be driven by said second input shaft, whereby when said first input shaft is released from driven connection with the engine and said first shift clutch is disengaged, said first motor/generator is actuated to synchronize the rotary speed of said first input shaft to that of said first speed gear driven by said output gear.

15. The twin-clutch transmission of claim 11 further comprising:

a second output gear fixed to said output shaft;

a third speed gear rotatably supported on said first input shaft and meshed with said second output gear; and a fourth speed gear rotatably supported on said second input shaft and meshed with said second output gear;

wherein said first shift clutch is operable for releasably coupling said third speed gear to said first input shaft, and said second shift clutch is operable for releasably coupling said fourth speed gear to said second input shaft.

16. The twin-clutch transmission of claim 11 wherein the driveline is a front driveline and said output shaft drives a final drive unit including a differential and left and right front axle shafts.

17. The twin-clutch transmission of claim 11 wherein said first and second engine clutches and said first and second shift clutches are electrically-actuated devices controlled by said controller for automatically shifting between a first gear ratio established by said first speed gear and a second gear ratio established by said second speed gear.

18. The twin-clutch transmission of claim 17 wherein said first and second shift clutches are electrically-actuated dog clutches.

19. The twin-clutch transmission of claim 11 further comprising a transfer shaft releasably driven by said first engine clutch, and a power transfer assembly coupling said transfer shaft to said first input shaft.

20. The twin-clutch transmission of claim 19 wherein said power transfer assembly includes a first sprocket fixed to said first input shaft, a second sprocket fixed to said transfer shaft, and a chain meshed with said first and second sprockets.

* * * * *